United States Patent
Schweikart et al.

(10) Patent No.: US 8,245,698 B2
(45) Date of Patent: Aug. 21, 2012

(54) VALVE FOR FUEL DEVICES

(75) Inventors: Marco Schweikart, Ludwigsburg (DE); Bernd Nageldinger, Asperg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 294 days.

(21) Appl. No.: 12/689,119

(22) Filed: Jan. 18, 2010

(65) Prior Publication Data

US 2010/0192924 A1     Aug. 5, 2010

(30) Foreign Application Priority Data

Jan. 21, 2009   (DE) .......................... 10 2009 005 595

(51) Int. Cl.
*F02M 37/00*     (2006.01)
*F02M 37/04*     (2006.01)

(52) U.S. Cl. ........................................ 123/510; 123/511

(58) Field of Classification Search .................. 123/510, 123/511, 512, 514, 462, 457, 459, 460, 468; 251/12, 337

See application file for complete search history.

(56) References Cited

U.S. PATENT DOCUMENTS

| | | | | |
|---|---|---|---|---|
| 2,290,080 | A | * | 7/1942 | Wahlmark ............... 137/115.14 |
| 3,339,574 | A | * | 9/1967 | Erb et al. ....................... 137/102 |
| 3,606,905 | A | * | 9/1971 | Fehler .............................. 37/107 |
| 3,853,142 | A | * | 12/1974 | Grundman ................. 137/487.5 |
| 3,965,919 | A | * | 6/1976 | McGarvey et al. ........... 137/107 |
| 6,289,919 | B1 | * | 9/2001 | Sledd et al. .............. 137/115.03 |
| 7,634,986 | B2 | * | 12/2009 | Kuroda et al. ................. 123/457 |

FOREIGN PATENT DOCUMENTS

DE     102005021445 A1 *  11/2006

* cited by examiner

*Primary Examiner* — Mahmoud Gimie
(74) *Attorney, Agent, or Firm* — James Hasselbeck

(57) ABSTRACT

A valve for controlling volume flows of fuel supply systems of internal combustion engines has a conduit having an inlet and an outlet defining a flow direction. A bypass opening is provided in the conduit. A sleeve is slidably arranged in the conduit and covers in one position the bypass opening completely. The sleeve has an axial through bore that connects the inlet and the outlet. An elastic element that is arranged in the conduit and exerts onto the sleeve a force that is directed toward the inlet. A counterforce is generated by the flow resistance of the sleeve that counteracts the force of the elastic element.

14 Claims, 3 Drawing Sheets

VALVE FOR FUEL DEVICES

CROSS REFERENCE TO RELATED APPLICATIONS

Priority is claimed based on Federal Republic of Germany patent application no. DE 10 2009 005 595.9 filed Jan. 21, 2009.

BACKGROUND OF THE INVENTION

The invention concerns a valve, in particular for controlling volume flows in a fuel supply device of internal combustion engines.

Fuel supply devices for internal combustion engines that have a low-pressure section and a high-pressure section are known in the art. The low-pressure section contains, for example, a low-pressure pump and at least one fuel filter; the filtered fuel is supplied to a high-pressure pump that supplies the injection system with fuel.

The system is designed such that, particularly when the engine operates at partial load or in an overrun state, a volume flow is conveyed by the high-pressure pump that is higher than what is being supplied by the injection system into the combustion chambers. The excess volume flow of the injection system and high-pressure pump is returned by a return passage to the fuel container. The energy that is employed for compressing the fuel thus remains unused.

The publication DE 10 2005 021 445 A1 discloses a flow regulator for fuel supply devices that comprises a housing in which a flow limiting element is slidably arranged and, by a sliding action, changes the flow cross-section of a flow passage.

There remains a need in the art for a fuel control valve that is configured to operate an engine fuel supply system in an energy efficient way.

SUMMARY OF THE INVENTION

It is an object of the present invention to configure a fuel system such that it can be operated in an energy-efficient way.

In accordance with the present invention, this is achieved by a valve that comprises an inlet and an outlet, a conduit that connects the inlet and the outlet with one another and comprises a bypass opening, and a sleeve that is arranged slidably in the conduit and that covers in one position the bypass opening, wherein the sleeve has an axial through bore that connects the inlet and the outlet. An elastic element is arranged in the conduit and exerts on the sleeve a force that is oriented toward the inlet.

The bypass opening is arranged laterally on a circumference of the conduit, wherein the sleeve that is arranged slidably in the conduit covers the lateral bypass opening in one position.

The through bore of the sleeve has within one section a flow cross-section that decreases in the flow direction.

In a no-flow state of the valve the elastic element forces the sleeve against a stop, wherein the bypass opening is covered by the sleeve.

In a flow-through state of the valve, a counterforce that results from the flow resistance of the sleeve acts on the sleeve in a direction opposite to the force of the elastic element.

When surpassing a given volume flow, the counterforce surpasses the force of the elastic element so that the sleeve is moved in the flow direction and the bypass opening is released. The given volume flow is in a range of 10-1000 l/h, preferably in a range of 300 to 600 l/h, and more preferred in a range of 500+/−50 l/h.

The bypass opening is connected to a return passage that is connected to a storage tank.

The sleeve has at its circumference an opening that can be brought into an overlap position with the bypass opening of the conduit by displacement of the sleeve in or counter to the flow direction.

The sleeve according to the invention comprises an inlet, an outlet, a conduit, a sleeve slidably arranged in the conduit, and a spring that is also arranged in the conduit and exerts a force on the sleeve in a direction opposite to the flow direction through the valve. The sleeve has axially a flow cross-section through which fuel can pass. The valve has furthermore a bypass opening arranged on the circumference of the conduit that in the unloaded state is at least partially covered by the sleeve.

The sleeve is advantageously designed such that relative to the adjoining areas of the conduit it has partially a reduced flow cross-section. Therefore, the sleeve advantageously may act as a throttle. When liquid passes through the sleeve, as a result of the flow resistance, a force that depends on the volume flow is acting in the flow direction on the sleeve. The spring force of the spring counteracts this flow-induced force. When the flow-induced force surpasses the spring force, the sleeve is moved in the flow direction up to the point at which an equilibrium of the forces exists. As a result of the movement of the sleeve, the opening cross-section of the bypass opening that has been covered by the sleeve before is now released. Through this bypass opening a portion of the volume flow can thus flow out.

In one embodiment the sleeve is embodied as a throttle. For this purpose, advantageously in one section of the sleeve the flow cross-section in the flow direction is reduced. It is especially advantageous to provide the cross-sectional reduction mirror-symmetrically at both ends of the sleeve so that no particular mounting orientation must be observed.

In one embodiment the circumference of the sleeve across its entire length is of a closed configuration (no bores or openings in the sleeve wall) and the sleeve is arranged such that by displacement of the sleeve in the flow direction the bypass opening is released upstream of the sleeve.

In one embodiment the sleeve has an opening at its circumference. The opening is advantageously positioned such that upon displacement of the sleeve in the flow direction it can be brought into an overlap position with the bypass opening of the conduit.

In one embodiment the valve is part of a fuel conduit wherein the section of the conduit that is correlated with the valve is formed by a straight section having a substantially constant flow cross-section wherein the section is designed such that the components of the valve can be inserted from one end. The valve can be advantageously disposed in a cast part or injection-molded part of metal or plastic material, for example, in a fuel filter module.

In a particularly advantageous embodiment the section of the fuel conduit in which the valve is arranged is embodied as a counterbore in a conduit. The counterbore widens the flow cross-section of the conduit and the end of the counterbore serves as a stop for the spring. At the upstream end of the section provided for the valve a receptacle for a securing means is provided. The receptacle can be embodied, for example, as an inner thread or a groove.

In one embodiment, the diameter of the fuel conduit is constant across the entire length of the valve. At the outlet side the valve is advantageously delimited by a step in the form of a cross-sectional reduction or a securing ring on which the spring is supported.

In one embodiment, the valve comprises a securing means, for example, a securing ring, that is introduced into a groove or a sleeve with an outer thread that is screwed into the conduit. The securing means forms upstream of the sleeve a stop for the sleeve in order to prevent it from falling out of the conduit.

In one embodiment the sleeve is connected to the spring so that sleeve and spring can be mounted in single working step. For example, the connection is realized by clamping the spring, for example, onto the exterior side or the interior side of the sleeve.

In one embodiment the securing means is connected to the sleeve so that the securing means and the sleeve can be mounted in a single working step. The connection is realized, for example, by clamping the securing means on the sleeve.

In one embodiment, the securing means and the sleeve are embodied together as a monolithic part. Advantageously, in such embodiment the securing means is separated during assembly from the sleeve. For this purpose, the cross-sectional part that connects the securing means and the sleeve is embodied in this connection especially advantageously as a rated breakpoint. This can be realized, for example, in the form of small webs or very thin circular ring-shaped connecting sections.

Advantageously, spring, sleeve, and securing means are connected to one another and in particular mountable in a single working step for assembly of the valve. During mounting, the assembled parts are inserted into the conduit and secured in position by the securing means (for example, by snapping into place the securing ring or by screwing in the threaded sleeve). In a subsequent sub-step, by further pushing in the sleeve, for example, by means of a pin, the connection between the sleeve and the securing means is released.

In one embodiment the sleeve is made of plastic material by an injection molding process, It is especially preferred that the securing means and the sleeve together are formed as a monolithic part.

In another embodiment the sleeve is made from metal, in particular an aluminum alloy or steel.

In one embodiment the inlet of the valve is connected to the return passage of a fuel injection system (for example, return passage of the injection valves or return passage of the so-called common rails) and/or to the return passage of the high-pressure fuel pump.

In another embodiment the valve is integrated into a fuel filter module wherein valve spring, sleeve, and securing means are inserted into a section of a fuel conduit provided for this purpose, wherein the fuel conduit in this area has means for supporting the spring (for example, a step), a constant diameter in which the sleeve is receivable, a circumferential opening and means for receiving the securing means (for example, groove for receiving a spring ring or thread for receiving a screw-in sleeve).

In one embodiment, the bypass opening of the valve is connected to a return passage connected to the fuel tank.

In another embodiment the outlet of the valve is connected to the inlet of a fuel prefilter or the outlet of a low-pressure pump.

The invention concerns moreover a fuel supply system for internal combustion engines and a filter module for such a fuel supply system, comprising a valve according to one of the described embodiments as well as a high-pressure pump and a low-pressure pump, a prefilter and a main filter.

The valve according to the invention has the advantage that in a beneficial way a volume flow-controlled bypass valve is realized. This valve enables the limitation of the volume flow passing through the sleeve to a value that is predetermined as a result of the valve configuration. When the outlet of the valve is connected to the inlet of the prefilter or the low-pressure pump, the return volume flow can be limited to a maximum value. In this way it is achieved that the system, in addition to the heated volume flow that is returned from the high-pressure pump or the injection system, is also supplied continuously with a cooler partial volume flow from the fuel tank. In this way, on the one hand a portion as large as possible of the energy that has been employed for compression of the fuel remains in the system wherein at the same time overheating of the fuel supply system is prevented.

When, for example, during overrun operation of the internal combustion engine a high volume flow is returned from the high-pressure pump and/or the injection system, the returned volume flow can surpass quickly a maximum value. As soon as this maximum value has been reached at the valve, the valve opens the bypass opening and a portion of the volume flow can return to the storage container. When the returned volume flow is below the maximum value, it is completely supplied through the outlet of the valve to the prefilter or the low-pressure pump. When the returned volume flow is above the maximum value, only the maximum permissible volume flow is returned.

The simple embodiment of the valve advantageously enables mounting of the individual parts from one end of the conduit in one working step. As a result of the arrangement of the valve in an existing section of the fuel line, no costs for the valve body and no additional space are required. For integrating the valve, for example, only a counterbore, an additional inner thread as well as a connecting opening between fuel line and outlet are required. With a standardization of the external dimensions of the valve in combination with springs of different spring constant and sleeves of different flow cross-sections a standardized construction element can be realized that can be individually matched to specific conditions of an application.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1A:
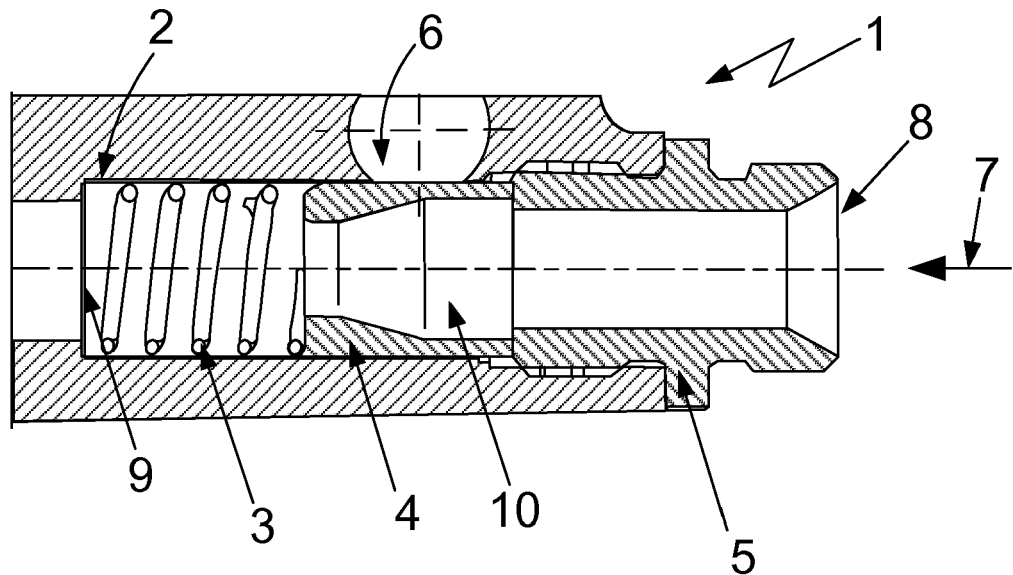
FIG. 1a shows an embodiment of a valve with closed bypass opening.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a valve for a fuel supply system as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1B:
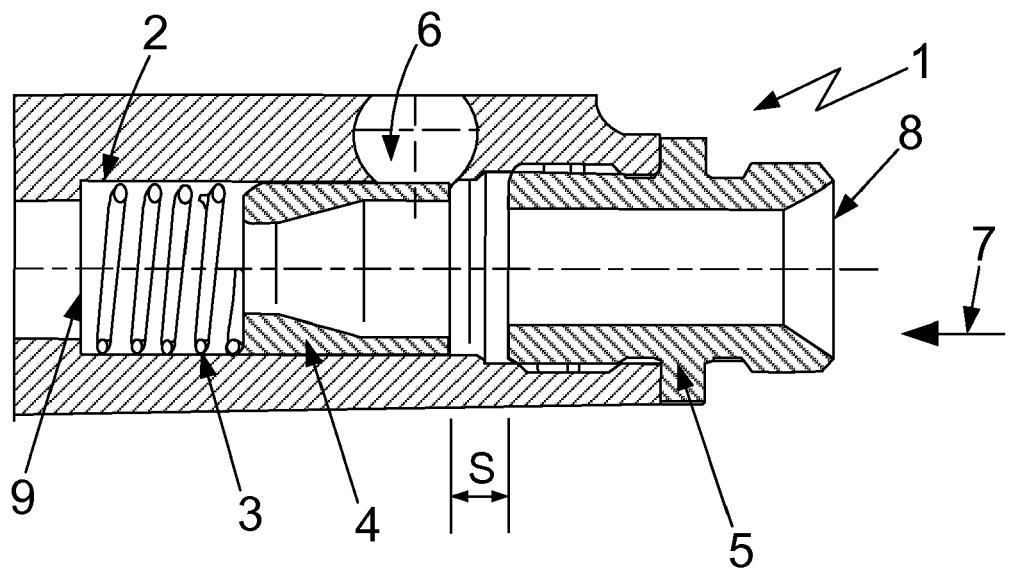
FIG. 1b shows an embodiment of a valve with open bypass opening.

FIGS. 1a and 1b show a valve according to the invention wherein in FIG. 1a the valve is shown with closed bypass opening and FIG. 1b the valve is shown with open bypass opening. The valve 1 comprises a straight tubular section of the fuel line or conduit 2 which relative to the section of the fuel line arranged downstream has a greater flow cross-section. The valve 1 further comprises an inlet 8 and an outlet 9 as well as a valve spring 3 and a sleeve 4 inserted into the fuel line 2. The sleeve 4 has an axial throughbore 10 and a flow cross-section that becomes smaller in the flow direction. The valve 1 comprises moreover a securing element 5 that is screwed into the fuel line 2 upstream of the sleeve 4 and prevents the sleeve 4 from falling or sliding out of the fuel line 2. A bypass opening 6 is arranged so as to branch off the fuel line 2; in FIG. 1a the bypass opening 6 is covered by the sleeve 4.

When a fluid passes through the sleeve 4, a dynamic pressure is generated that provides a counterforce by means of which the sleeve 4 is moved opposite to the force of the spring 3 in the flow direction 7.

In FIG. 1b, the sleeve 4 that has been moved by the counterforce by the stroke s is illustrated and now releases a portion of the bypass opening 6 so that a portion of the volume flow can escape through the bypass opening 6. Mounting of spring, sleeve, and securing element is realized from one end of the fuel conduit 2.

Figure 2:
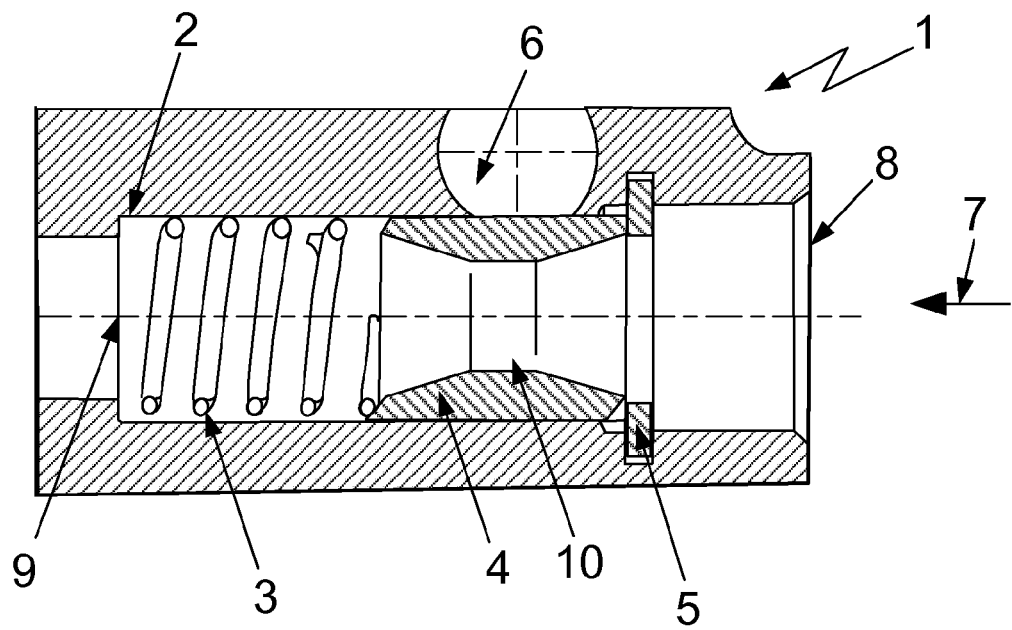
FIG. 2 shows a further embodiment of a valve with closed bypass opening.

FIG. 2 shows in analogy to FIG. 1 a valve 1 according to the invention with a securing ring as a securing element 5 and with a sleeve 4 that has an axial throughbore 10 with a cross-sectional configuration that is minor-symmetrical to its perpendicular center plane with restricted flow cross-section at the middle.

Figure 3:
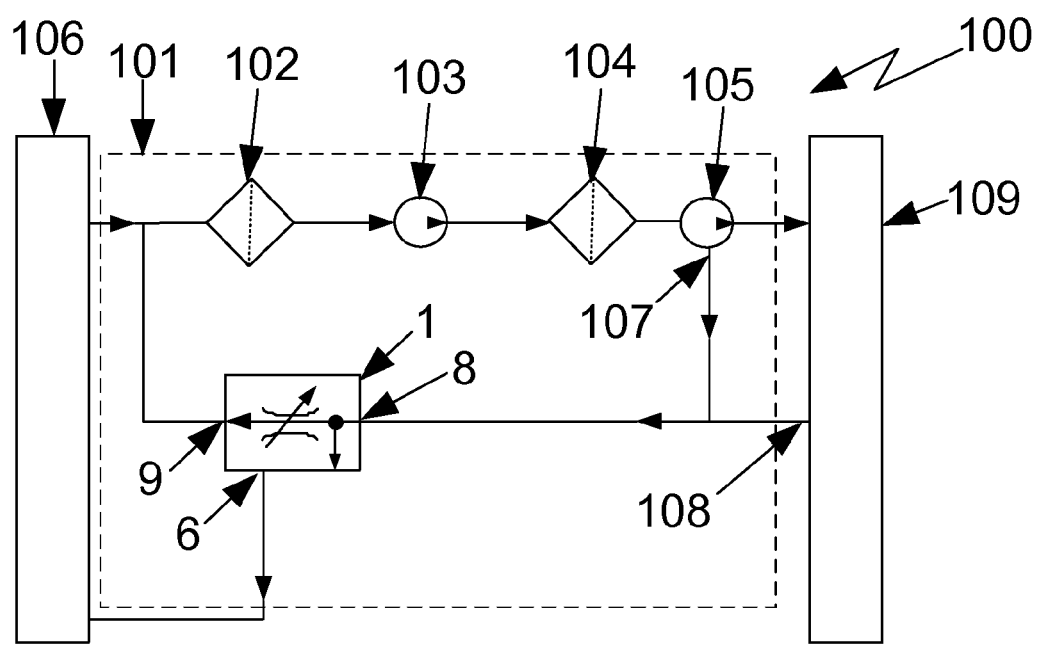
FIG. 3 schematically illustrates a section of the fuel supply system of an internal combustion engine.

FIG. 3 shows schematically the arrangement of a valve 1 according to the invention in a fuel supply system 100. The valve 1 is arranged in a filter module 101 that further comprises a prefilter 102, a low-pressure pump 103, a main filter 104, and a high-pressure pump 105. The inlet of the prefilter 102 and the bypass opening 6 of the valve 1 each are connected to a storage container 106. The inlet 8 of the valve 1 is connected to the return passage 107 of the high-pressure pump 105 as well as the return passage 108 of the high-pressure injection system 109. When, for example, in overrun operation of the internal combustion engine a high volume flow is returned from the high-pressure pump 105 and the injection system 109, the returned volume flow can quickly surpass a maximum value. As soon as this maximum value is reached at the valve 1, the valve 1 opens the bypass opening 6 and a portion of the volume flow can flow back into the storage container 106. When the returned volume flow is below the maximum value, it is completely returned through outlet 9 of the valve 1 to the prefilter 102. When the returned volume flow surpasses the maximum value, only the maximum permissible volume flow is returned.

Figure 4:
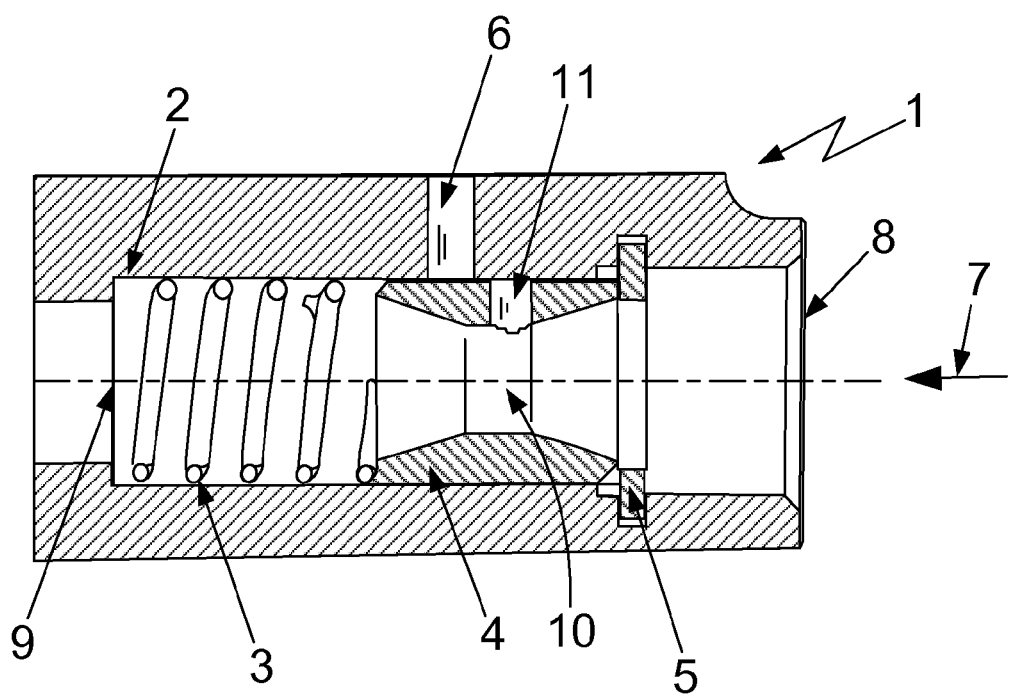
FIG. 4 shows a further embodiment of the valve.

FIG. 4 shows a further embodiment of a valve. Here, the sleeve 4 has at its circumference an opening 11. The opening 11 is positioned such that by moving the sleeve 4 in the flow direction the opening 11 is brought into an overlap position with the bypass opening 6 of the fuel conduit 2.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A valve comprising:
 a tubular conduit including
  a fluid inlet arranged on one axial end of said tubular conduit;
  a fluid outlet arranged on an opposing axial end of said tubular conduit, said axially arranged inlet and outlet defining an axial flow direction common to both said fluid inlet and fluid outlet;
 wherein fluid flows in said axial flow direction entering said inlet, flows in said axial flow direction through said tubular conduit and then flows in said axial flow direction to exit said outlet;
 a bypass opening arranged laterally in a circumferential wall of said tubular conduit;
 a sleeve slidably arranged in said conduit and covering in one position said bypass opening;

wherein said sleeve has a continuously open axial through bore that continuously connects said inlet and said outlet for fluid flow; and an elastic element that is arranged in said conduit and exerts onto said sleeve a force that is directed toward said inlet.

2. The valve according to claim 1, wherein
said through bore of said sleeve includes a tapering flow cross-section that decreases in said axial flow direction through the valve.

3. The valve according to claim 1, wherein
in a no-flow state of the valve said elastic element forces said sleeve against a stop and said bypass opening is covered completely by said sleeve.

4. The valve according to claim 1, wherein
in a flow-through state of the valve a counterforce resulting from a flow resistance of said sleeve acts on the sleeve in a direction opposite to said force of said elastic element.

5. The valve according to claim 4, wherein,
when a given volume flow is surpassed, said counterforce surpasses said force of said elastic element so that said sleeve is moved in said flow direction and said bypass opening is released.

6. The valve according to claim 5, wherein
said given volume flow is in a range of 10 l/h to 1000 l/h.

7. The valve according to claim 6, wherein
said given volume flow is in a range of 300 l/h to 600 l/h.

8. The valve according to claim 7, wherein
said given volume flow is in a range of 500 l/h+/−50 l/h.

9. The valve according to claim 1, wherein
said bypass opening is connected to a return passage that is connected to a storage tank.

10. The valve according to claim 1, wherein
said sleeve has a circumferential opening that, by moving said sleeve in said flow direction or opposite to said flow direction, is brought into an overlap position with said bypass opening of said conduit.

11. A liquid filter comprising a valve according to claim 1.

12. A fuel supply system of an internal combustion engine, the fuel supply system comprising:
a prefilter and a main filter;
a low-pressure pump disposed between said prefilter and said main filter;
a high-pressure pump disposed downstream of said main filter;
a valve arranged in a fuel conduit of the fuel supply system, wherein said valve has a tubular conduit including
a fluid inlet arranged on one axial end of said tubular conduit;
a fluid outlet arranged on an opposing axial end of said tubular conduit, said axially arranged inlet and outlet defining an axial flow direction common to both said fluid inlet and fluid outlet;
wherein fluid flows in said axial flow direction entering said inlet, flows in said axial flow direction through said tubular conduit and then flows in said axial flow direction to exit said outlet;
a bypass opening arranged laterally in a circumferential wall of said tubular conduit;
a sleeve slidably arranged in said conduit and covering in one position said bypass opening;
wherein said sleeve has a continuously open axial through bore that continuously connects said inlet and said outlet for fluid flow; and
an elastic element that is arranged in said conduit and exerts onto said sleeve a force that is directed toward said inlet.

13. The fuel supply system according to claim 12, wherein
said inlet of said valve is connected to at least one of a first return passage of a fuel injection system connected to the fuel supply system and a second return passage of said high-pressure pump; and
wherein said bypass opening is connected with a third return passage to a fuel tank and wherein said outlet of said valve is connected to an inlet of said prefilter or to an inlet of said low-pressure pump.

14. A filter module for filtering fuel of an internal combustion engine, comprising a fuel supply system according to claim 12.

* * * * *